March 6, 1934.   B. STÖCKFLETH ET AL   1,950,094
METHOD OF PRODUCING BEARINGS
Filed Dec. 9, 1927    2 Sheets-Sheet 1
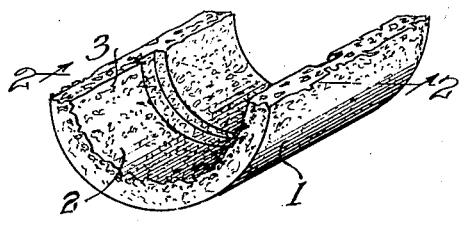
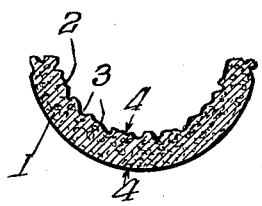
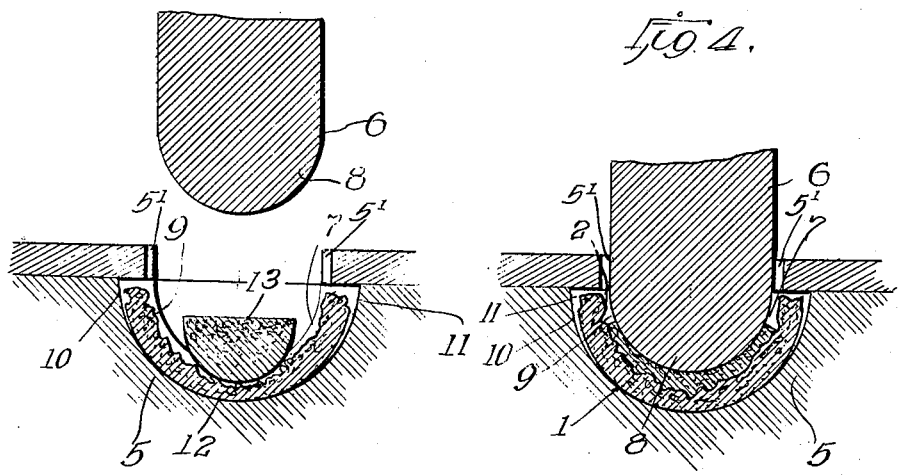
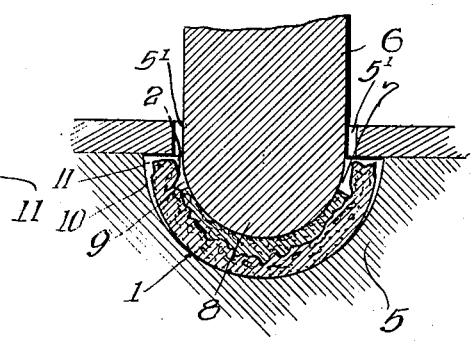
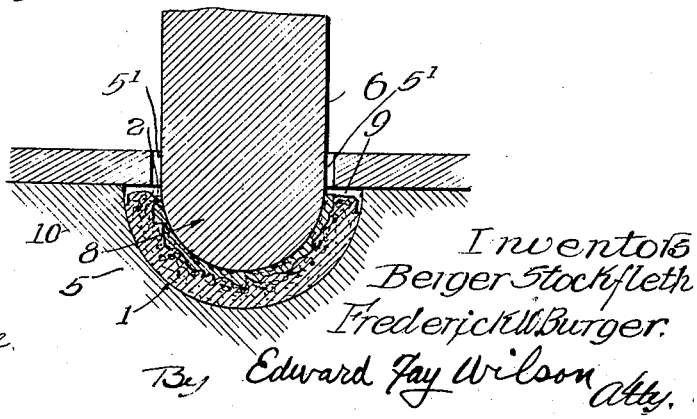
Inventors
Berger Stockfleth
Frederick W. Burger.
By Edward Jay Wilson
Atty.
Witness:
Harry R. L. White.

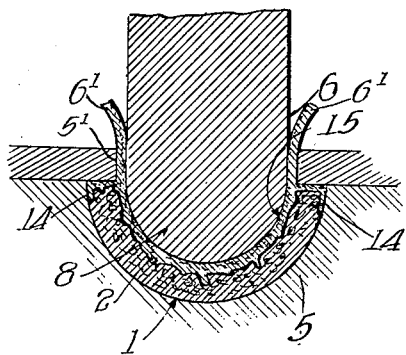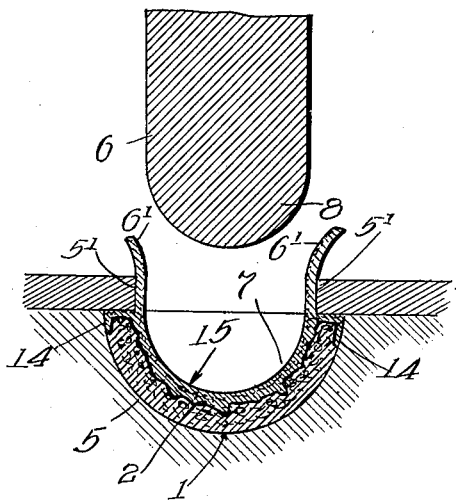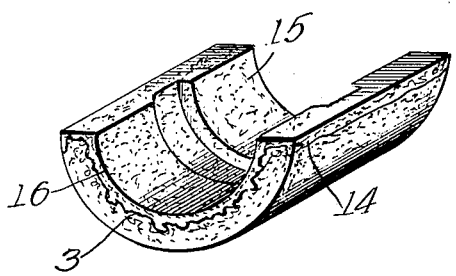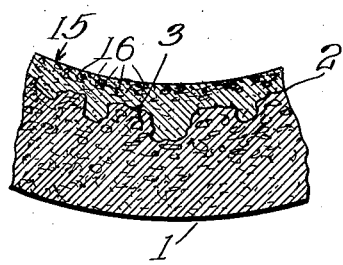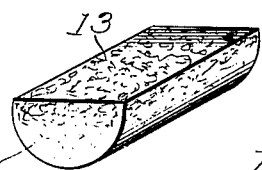

Patented Mar. 6, 1934

1,950,094

UNITED STATES PATENT OFFICE 1,950,094

METHOD OF PRODUCING BEARINGS

Berger Stockfleth and Frederick W. Burger, Niles, Mich., assignors, by mesne assignments, to The Cleveland Graphite Bronze Company, Cleveland, Ohio, a corporation of Ohio Application December 9, 1927, Serial No. 238,835

16 Claims. (Cl. 29—149.5)

Our invention relates to improvements in bearings and has special reference to bearing shells or linings which have backs of a relatively hard metal, such as brass or steel, and an inner facing or lining of Babbitt metal.

Formerly the backing was machined to bring it to the shape and dimensions required, then it was tinned to make the babbitt stick to it, then the Babbitt lining was cast in place and finally the shell was machined to bring it to accurate dimensions. This, roughly, was the method in use until our invention described and claimed in our United States Letters Patent No. 1,492,119 was disclosed. In said patent we disclosed a bearing made of a pre-formed brass shell or backing faced with an inner lining of babbitt made in accordance with our said patented improvement, the babbitt being formed into the shell by very great pressure in a suitable mold comprising a die and a plunger. The shell disclosed was shown as being formed by some method to substantially fill and fit in the die or outer part of the mold and with a fairly smooth and solid inner surface for contact with the Babbitt metal to be formed therein.

In the further development and use of our invention, as disclosed in said patent, we have discovered means for making such bearings much more perfect in the attachment of the babbitt to the backing and also in greatly cheapening the formation of the backing shell, as all machining is eliminated.

In our present invention we first cast the backing shell of some malleable metal, such as brass, steel, etc., and roughly in the shape and form desired. We designedly make this casting porous, particularly upon its inner surface, for a purpose to be explained later. The porosity of the casting may be considerably increased by the well known pickling process to which such castings are subjected to help free them from the sand particles which adhere to them in the process of casting in sand molds. The castings having been thus cleaned are placed in the mold of a press which is shaped to produce the outer surface of the bearing contemplated. Purposefully the casting does not fit the mold but is of smaller radius and the plunger of the press which is forced into the mold to form the inner surface of the bearing is arranged to initially subject the middle portion of the shell to the forming pressure and gradually extend the pressure to the side wings of the shell. Preparatory to applying this forming pressure a suitable piece of original or virgin Babbitt metal of the desired quality or constituency is placed in the shell between the plunger and the middle portion of the shell and in position to first receive the pressure. To aid in the adherence of the Babbitt metal to the shell the shell is preferably first covered with a thin coating of tin which is applied hot and does not fill the openings in the surface of the casting.

The first application of the pressure by the plunger causes the Babbitt metal piece to conform to the plunger and to the shell and the further pressure causes the shell and the Babbitt lining to conform accurately with the mold. In this process the babbitt being softer than the shell is forced into all the minute pits, interstices and openings in the adjacent surface of the shell, and, as will be clearly seen, the actual forming of the shell will tend to distort and compress the openings in the shell compressing therein and actually biting into the softer metal. By this means the Babbitt lining is caused to be joined to the surface of the shell in a manner well described by the word "knit". The wing portions or sides of the shell are purposely made shorter than the finished bearing. This is to allow for actual elongation in the forming step and results in a further valuable feature. The Babbitt lining being softer than the shell is crowded out first and advances in the mold beyond the edges of the shell, and the shell being of smaller radius, as roughly formed, than the mold, the edges of the shell are at first spaced from the adjacent walls of the mold. The bearing metal which has been forced in advance of the edges of the shell is forced, to some extent, around and behind said edges, and the final forming pressure causes this Babbitt metal to encase the edges of the shell and extend down the outer surfaces of the shell edges, thus assisting materially in interlocking the Babbitt metal lining to the shell and providing a shell which has Babbitt metal edges as well as an inner surface of same and greatly enhancing the finished appearance of the shell.

The Babbitt metal piece which is placed within the shell in the mold is first heated to a temperature which renders it malleable but not fluid in the ordinary sense, hence its original internal structure is not materially changed by the formation process, but the original size and distribution of the antimonoid crystals which form the wear resisting part of the bearing is maintained in the final bearing, a result which was first attained by us, as first disclosed in our said patent.

Our invention will be more readily understood by reference to the accompanying drawings forming part of this specification and in which:

Fig. 1 is a perspective view of the rough casting which forms the backing of the finished bearing sleeve or shell;

Fig. 2 is a cross-sectional view of the rough casting on the line 2—2 of Fig. 1, the pits or openings greatly exaggerated;

Fig. 3 is a fragmentary, vertical cross-section of a die and plunger illustrating one of the steps in the operation of producing our improved bearing shells;

Figs. 4, 5, 6 and 7 are views similar to Fig. 3 and showing further steps in the process of producing one of our improved bearing shells;

Fig. 8 is a perspective view of a finished shell;

Fig. 9 is a greatly enlarged fragmentary, sectional view of the finished shell; and Fig. 10 is a perspective view of a piece of the virgin Babbitt pig, such as is used in the process of making one of our improved bearing shells.

In said drawings, 1 illustrates a backing for a shell preferably cast into shape and preferably having at least its inner surface 2 pitted, rough or formed with small openings, as indicated at 3. These backings are made of metal which is slightly malleable, such as steel, malleable iron, bronze, brass, etc., and the pits 3 can be formed in any suitable manner, such as casting the metal in said molds which have not been made smooth. In cleaning the castings the adhering sand can be eaten out with acid or removed in any other convenient manner, the object being to leave the surface of the casting with small pits or depressions 3 which shall be distorted in the shell forming process.

In Fig. 2, the heavy outer line 4 indicates that the casting 1 has been tinned preparatory to the next step. We have found that while it is preferable to tin the castings it is not absolutely necessary as our process of causing the babbitt to adhere mechanically to the backing is effective for this purpose without the tin. The tin coating, however, results in a more perfect bond over the entire surfaces of the two metals. This is caused by the extreme pressure to which the metals are subjected in the pressing and forming process and to the slight but positive movement of the bearing metal upon the backing. The pressure combined with the movement under the pressure produces sufficient heat to cause an actual molecular joining of the tin coating and the bearing metal throughout practically the whole of their contacting surfaces.

In Figs. 3 to 7 inclusive, the mold in which the sleeve is formed is indicated, 5 being the die, 6 the plunger. The die has a semi-cylindrical opening 7 for forming the outer surface of the sleeve or shell and the plunger has a semi-cylindrical lower end 8 adapted to enter into the die opening 7 and form the inner surface of the bearing shell. The die 7 is closed at its ends by walls 9 which form the ends of the shells.

As indicated in Fig. 3, the rough casting 1 is of smaller radius than the opening in the die, and consequently when the casting is laid in the die with its hollow side up the edge portions 10 of the casting do not contact with the surface of the die but are spaced slightly therefrom, as shown at 11.

Preferably, though not necessarily, the Babbitt metal piece 12 which is placed within the shell is somewhat semi-cylindrical in cross-section. The top flat surface 13 is the original top surface of the Babbitt metal pig as it is cast when originally produced, and, as shown, this top surface 13 is placed uppermost and with which the plunger 6 first contacts. As the plunger 6 descends into the die it first spreads out the Babbitt metal around the inner surface of the casting, and as the babbitt is much more malleable than the backing it readily flows over the surface of same and up around and behind the upper edges 11 of the casting and is even forced down behind the upper ends, as indicated at 14, Figs. 5, 6, 7 and 8. As the plunger descends further the shell 1 is forced back against the inner surface of the die, the casting being actually stretched circumferentially in the operation. This action is very beneficial for it distorts the pits or openings into which the softer Babbitt metal has been previously forced and this distortion of these pits causes the metal of the casting 1 to bite into the small bearing metal projections and cause the bearing metal lining to be also bound mechanically to the casting substantially on its entire inner surface and its longitudinal edge portions as well.

In determining the quantity of bearing metal 13 to be placed in the mold a piece is selected which is more than sufficient for the purpose and the die is provided with relief openings 5', one at each side at the top through which the excess bearing metal can escape. These openings are made small enough so that the desired pressure will be maintained in the forming operation. In Figs. 6 and 7, the excess metal is shown at 6' as having been forced out of the mold.

Another important feature of our invention is that the tremendous pressure to which the cast malleable backs are subjected, in the forming process, and which actually elongates these members also has the effect of changing their internal structure so that they are more like forged or wrought pieces than like castings. They are actually considerably compacted and this results in a greater heat conductivity which adds to their efficiency as bearings.

The inner surface 15 of the finished sleeve is constituted of the top surface of the piece of bearing metal and the structure of the bearing metal has not been changed by the pressure formation, as the bearing metal is merely heated to a point to render it malleable but not to any extent melt the lead or tin base in which the antimonoid crystals are embedded. This arrangement of the crystals is a great advantage for the reason that they form the actual wearing surface of the bearing sleeve. As explained heretofore, the flowing of the bearing metal over the surface of the casting in the process, not only causes the bearing metal to enter into and fill all of the pits and openings and be securely anchored therein, but also causes it to adhere molecularly to the layer of tin which covers the surface of the casting when tin is used, thus adding to the bond between the bearing metal and the backing.

As many modifications of our invention will readily suggest themselves to those skilled in the art, we do not limit or confine our invention to the specific steps or structures herein shown and described.

We claim:

1. The herein described method of making a bearing lining or sleeve, which consists in making a pitted member of a relatively harder metal roughly of the shape of the finished bearing and pressing bearing metal onto said fitted member to form a wearing surface and by pressure forming the backing and added bearing metal into the shape desired the pressure applied being sufficient to thin the sleeve radially and elongate it circumferentially.

2. The herein described method of making a bearing which consists in forming a backing of a relatively harder metal and roughly of the form and dimensions of the finished bearing having pits or openings on its surface, applying bearing metal to such surface and applying pressure to force the bearing metal into said pits or openings, and distorting said openings after they are filled with the bearing metal to interlock the two metals.

3. The herein described method of making a semi-cylindrical bearing shell, which consists in providing a backing of a relatively hard metal and of a shape and size roughly conforming to the finished shell but of smaller radius, and pressing malleable bearing metal into the interior of the backing and by pressure, forming the backing and bearing metal lining into an integral unit of larger outer diameter than the original backing.

4. The herein described method of making a semi-cylindrical bearing shell, which consists in providing a rough backing of a relatively hard though malleable metal and of smaller radius than the finished product, pressing malleable bearing metal into the interior of the backing and by pressure, causing the bearing metal to spread over the interior and edges of the backing and increasing the radius of the shell.

5. The herein described method of making bearing shells, which consists in providing cast metal backs of malleable metal, the backs being of smaller dimensions than the finished shell, pressing malleable bearing metal into the interior of the rough backs, and by pressure causing the several dimensions, except radial thickness of the backs, to be increased and the backs compressed and interlocking the bearing metal and the backs.

6. The herein described method of uniting a softer metal to and upon a harder metal member, which consists in providing the surface of the harder metal to which the softer metal is to be applied with numerous pits defined by circumferential walls and distributed over the said surface and forcing the softer metal in said openings and subjecting the two metals to pressure substantially normal to the joining plane, sufficient to distort the walls of the pits as and for the purpose specified.

7. The herein described method of uniting a softer metal to and upon a harder metal member, which consists in providing the surface of the harder metal to which the softer metal is to be applied with numerous small pits defined by circumferential walls and distributed over the said surface, forcing the softer metal in said openings and distorting said openings after the softer metal has been forced into same.

8. The herein described method of making bearing sleeves which consists in providing bank sleeves somewhat less in circumferential dimensions and slightly greater in radial thickness than the destined sleeve and formed of one kind of metal on the inside and another kind on the outside, then applying sufficient pressure radially thereto to thin the sleeve radially and elongate it cimcumferentially.

9. The herein described method of making bearing sleeves which consists in providing blank sleeves somewhat less in circumferential dimensions and slightly greater in radial thickness than the destined sleeve and formed of one kind of metal on the inside and another kind on the outside, then applying sufficient pressure radially thereto to cause both metal parts to be thinned radially and simultaneously elongated circumferentially.

10. The herein described method of making bearing sleeves which consists in providing blank sleeves somewhat less in circumferential dimensions and slightly greater in radial thickness than the destined sleeve and formed of one kind of metal on the inside and another kind on the outside, the two metals being bonded to each other, then applying sufficient pressure radially thereto to cause the simultaneous elongation circumferentially of both the inside and the outside metals.

11. The herein described method of making bearing sleeves which consists in providing blank sleeves somewhat less in circumferential dimensions and slightly greater in radial thickness than the destined sleeve and formed of one kind of metal on the inside and another kind on the outside, the two metals being both mechanically and molecularly bonded together, then applying sufficient pressure radially thereto to cause the sleeve to be thinned radially and both metals to be simultaneously elongated circumferentially.

12. The herein described method of making a bearing lining or sleeve, which consists in making a pitted member of a relatively harder metal roughly of the shape of the finished bearing and pressing bearing metal onto said pitted member to form a wearing surface and by pressure forming the backing and added bearing metal into the shape desired, the pressure applied being sufficient to thin the sleeve radially and elongate it both circumferentially and longitudinally.

13. The herein described method of making bearing sleeves which consists in providing half-cylindrical backs of relatively tough, hard though slightly malleable metal such as steel, the backs covered on their inner surface with pits of various relative sizes, depth and contours, applying a layer of bearing metal to the pitted surface and pressing the bearing metal upon said surface with pressure sufficient to cause the bearing metal to completely fill the pits and to thin the two metals and elongate them.

14. In the process of forming metal articles in dies, roughly formed blanks being provided, the step of applying a forming pressure to the rough blank through the medium of a softer metal interposed between the blank and at least one of the die members, and whereby the applied pressure is practically uniformly distributed over the area of the rough blank somewhat commensurate to the application of hydraulic pressure, the applied pressure being sufficient to thin the blank in one direction and elongate it in another, and whereby the blank is accurately conformed to and with the die member with which it is in contact.

15. The herein described method of applying forming pressure to a metal article such as a roughly formed bearing back, which consists in interposing a relatively soft metal between the pressure applying member and the article, the softer metal serving to proctically uniformly distribute the forming pressure over the whole area of the rough blank, and the applied pressure being sufficient to thin the article in the direction of the applied pressure and elongate it in a direction normal to the applied pressure.

16. The herein described method of applying forming pressure to a metal article such as a roughly formed bearing back, which consists in interposing a relatively soft metal between the pressure applying member and the article, the softer metal serving to practically uniformly distribute the forming pressure over the whole area of the rough blank, the surface of the metal article to which the softer metal is applied being pitted, the applied pressure being sufficient to thin the article in the direction of the applied pressure and elongate it in a direction normal to the applied pressure, and the pits being distorted in the operation.

BERGER STOCKFLETH.
FREDERICK W. BURGER.